Aug. 11, 1942.    L. H. PERRY ET AL    2,292,843
ELECTRICAL REGULATING SYSTEM
Filed Sept. 20, 1940
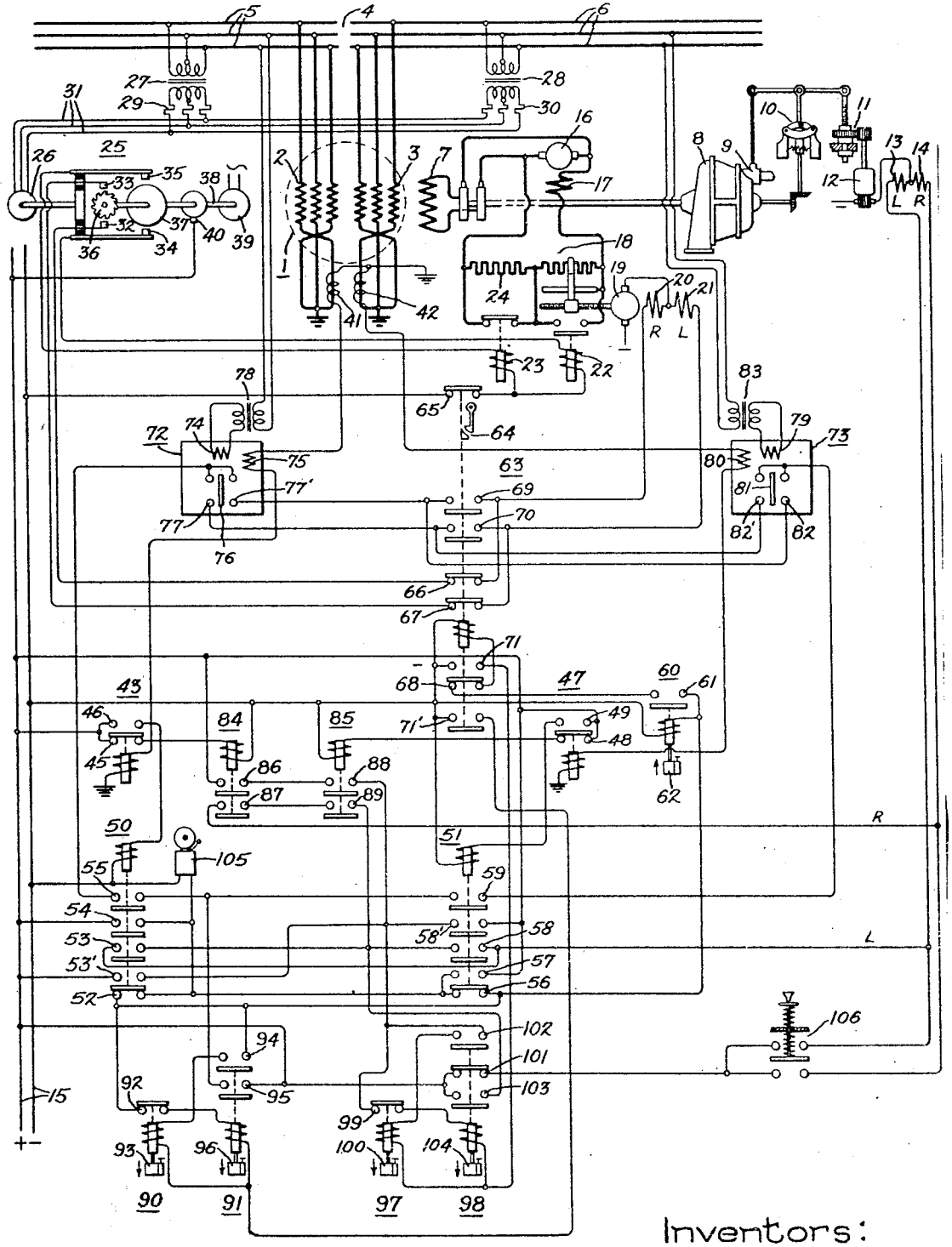
Inventors:
Leo H. Perry,
Herman Bany,
by Harry E. Dunham
Their Attorney.

Patented Aug. 11, 1942

2,292,843

UNITED STATES PATENT OFFICE 2,292,843

ELECTRICAL REGULATING SYSTEM

Leo H. Perry, Schenectady, N. Y., and Herman Bany, Lansdowne, Pa., assignors to General Electric Company, a corporation of New York Application September 20, 1940, Serial No. 357,604

10 Claims. (Cl. 171—119)

Our invention relates to electrical regulating systems for dynamo-electric machines and more particularly to load regulating systems for alternating current generators.

While our invention is applicable for use in certain aspects in connection with a plurality of generator circuits, it is particularly applicable and will be described, by way of illustration, in connection with double winding generators connected in a sectionalized bus system.

The commercial use of double-winding synchronous generators in bus systems has presented various problems among which are problems relating to controlling the relation or balance between the kilovolt-amperes (kva.) and kilowatts (kw.) of the respective windings during the various conditions of operation of the double-winding generator. In certain installations, it is required that the generator may be operated with one winding idle and with the other winding loaded, or that the respective windings may be operated simultaneously but with different percentage loadings. In most cases independent loading of one or the other winding, or unequal loading of the respective windings, must be limited to predetermined values; otherwise, there is danger of injuring the insulation of the machine due to the development of excessive temperatures.

It is an object of our invention to provide a new and improved regulating system for dynamo-electric machines.

It is another object of our invention to provide an improved load regulating system for a plurality of synchronous generator circuits.

It is a further object of our invention to provide an improved load regulating system for synchronous generators of the double-winding type.

It is a still further object of our invention to provide a regulating system for double-winding generators so that the respective windings of such generators may be operated with predetermined unequal loadings without subjecting the machine to harmful operating conditions.

In accordance with the illustrated embodiment of our invention, we provide current responsive means which will indicate the loading of the respective windings of a double-winding machine. If either winding, but not both, carries current over a predetermined value, such as fifty-five per cent of the generator rating for a certain time interval, a load back-off equipment is put into operation. The field excitation of the generator is normally controlled by a voltage regulator but the load back-off equipment transfers the field excitation control from the voltage regulator to a separate regulating relay which is arranged to hold substantially unity power factor on the generator. Simultaneously with the transfer of control from the voltage regulator to the reactive volt-ampere relay, the governor of the generator prime mover is controlled to effect a load reduction in increments until the load on the given generator winding is reduced to a predetermined value within a predetermined time. When the current in the overloaded winding is reduced to or less than the predetermined value, the operation of the load back-off equipment is terminated and the equipment is reset by the operator for control under the voltage regulator and manual governor setting.

Our invention will be better understood by reference to the following description taken in connection with the accompanying drawing, and its scope will be pointed out in the appended claims.

The single figure of the accompanying drawing is a diagrammatic illustration of an embodiment of our invention as applied to a three-phase double-winding synchronous generator connected to a sectionalized bus and operated by a prime mover.

Referring to the drawing, a three-phase double-winding synchronous generator 1 having a plurality of separately insulated stator windings 2 and 3 is connected to energize a main bus 4. The bus 4 is shown as comprising two sections 5 and 6. As illustrated, the generator winding 2 is connected to energize bus section 5 and the generator winding 3 is connected to energize bus section 6. It will, of course, be understood by those skilled in the art that other synchronous generators (not shown) are connected to the main bus 4 for operation in parallel with generator 1. The generator 1 is provided with an excitation circuit indicated by the rotatable field winding 7 which is arranged to be driven by a suitable prime mover 8, such as a steam turbine. The prime mover 8 is supplied with operating fluid through a valve or gate 9 maintained in a position dependent upon an operating condition of the turbine by means of a governor 10. Means are provided to change the adjustment of the governor mechanism such as by a synchronizing mechanism 11 connected to be operated in either direction by a reversible pilot motor 12. The pilot motor 12 is provided with field windings 13 and 14 which are connected to be energized selectively from a control bus 15 by the regulating mechanism to be described presently.

The field winding 7 of generator 1 is arranged to be energized by a direct current exciter 16 having a self-excited field winding 17, although obviously the well known pilot exciter excitation system could be used if desired. A motor-operated rheostat 18 is connected in circuit with field winding 17 and is arranged to be operated by a reversible pilot motor 19 having field windings 20 and 21 which are arranged to be energized selectively for raising or lowering the voltage of exciter 16. The exciter 16 is also provided with high speed raising or lower features which, as illustrated, comprise a "raise" contactor 22 and a "lower" contactor 23. The "raise" contactor 22 has its contacts normally open and is arranged to short circuit the rheostat 18 when energized. The "lower" contactor 23 has its contacts normally closed to short circuit an auxiliary resistance 24 in series with rheostat 18. When contactor 23 is energized, it serves to insert resistance 24 into the field circuit of exciter 16, thereby producing a relatively sudden decrease in the excitation produced by the exciter 16.

The motor-operated rheostat 18 and high speed contactors 22 and 23 are normally controlled by a voltage regulator indicated generally at 25. A suitable voltage regulator is of the type described and claimed in Patent No. 1,848,852, granted March 8, 1932, on an application of L. W. Thompson. This regulator is provided with a voltage responsive operating element illustrated as representing a three-phase torque motor 26. In order to control the excitation of the generator 1 to maintain the average value of the voltages of the windings 2 and 3 at a predetermined value, the torque motor 26 is connected to be energized from each of the bus sections 5 and 6 through a potential transformer 27 connected to bus 5 and potential transformer 28 connected to bus 6. The secondary winding of transformer 27 is connected through an impedance 29 and the secondary winding of transformer 28 is connected through an impedance 30 to a common circuit 31 to which the windings of the torque motor 26 are connected. With equal impedances, particularly with a high resistance component, the torque motor 26 responds to the average voltage of the buses 5 and 6. If desired, the impedances 29 and 30 may be selected or adjusted to be of different values so as to hold a voltage intermediate to the voltages of buses 5 and 6, other than the average voltage.

The torque motor 26 is arranged to operate contacts which are identified, respectively, as the slow speed "raise" and "lower" contacts 32 and 33 and high speed "raise" and "lower" contacts 34 and 35. The high speed "raise" and "lower" contacts 34 and 35 control the high speed contactors 22 and 23, respectively. Contacts 32 and 33 cooperate with a common center contact 36 having a notched circular form, and contacts 34 and 35 cooperate with a common center contact 37 having a smooth circular form. These center contacts 36 and 37 are mounted on a common shaft 38 and are rotated by a small constant speed motor 39 which may be connected to any convenient source of voltage. The center contacts are connected to one side of the control bus 15 through the brush contact 40. The rotation of the center contacts 36 and 37 provides automatic mechanical anti-hunting of the regular operation.

The apparatus just described will function to hold a constant average voltage between the bus sections 5 and 6 but there is no limitation on the current loading of either winding. In accordance with our invention, we provide equipment referred to herein as load back-off equipment to reduce the load on the generator whenever the current carried by either of the windings, but not both, exceeds a predetermined value. A common commercial current limit is 55 per cent of the generator rating and for purposes of simplifying the description, the predetermined current limit will be referred to as 55 per cent of the generator rating. In order to obtain response in accordance with the loading of the several generator windings, we provide current transformer 41 in a phase conductor of generator winding 2 and another current transformer 42 in a phase conductor of generator winding 3. Current transformer 41 is connected to energize the operating coil of a current limiting relay 43 which is provided with normally closed contacts 45 and normally open contacts 46. Current transformer 42 is connected to energize the operating coil of a current limiting relay 47 which is provided with normally closed contacts 48 and normally open contacts 49. The current limiting relays 43 and 47 control multi-contact auxiliary relays 50 and 51 respectively to provide a sufficient number of contacts to perform the necessary control functions. The operating coil of auxiliary relay 50 is arranged to be energized from the control bus 15 when the relay 43 is energized to close its normally open contacts 46. Similarly, the operating coil of auxiliary relay 51 is arranged to be energized when the normally open contacts 49 of relay 47 are closed. The relay 50 is provided with normally closed contacts 52 and normally open contacts 53, 53', 54 and 55. The relay 51 is provided with normally closed contacts 56 and normally open contacts 57, 58, 58' and 59. If both the relays 43 and 47 are picked up both the relays 50 and 51 are picked up and no circuit can be made to start the operation of the load back-off equipment. However, if one of the relays 43 or 47 and the associated auxiliary relay 50 or 51 is picked up, a circuit is completed to energize the control relay 60. Relay 60 is provided with a pair of normally open contacts 61 and is also provided with time delay closing means indicated by the dashpot 62 which may be adjustable from several seconds up to thirty seconds, depending upon the nature of the system. This time delay is for the purpose of preventing false operation of the load back-off equipment on system faults. Normally, such faults will have had ample opportunity to clear in thirty seconds or less. The closing of contacts 61 of relay 60 energizes the operating coil of a hand reset relay 63. The hand reset mechanism is indicated by the manually operated latch 64. Relay 63 is provided with normally closed contacts 65, 66, 67 and 68 and normally open contacts 69, 70, 71 and 71'. When relay 63 picks up it latches in and transfers control from the voltage regulator 25 to a reactive volt-ampere relay 72 or 73. Although various types of reactive volt-ampere relays may be used, a satisfactory type comprises the double-throw relay 72 which has one potential coil 74, one current coil 75 and a movable contact 76 which floats between two sets of fixed contacts 77 and 77' at unity power. The relay would be designed to have maximum torque at zero phase angle between the current in its current winding and the potential across its potential winding. With this type of relay, it is only necessary to use the usual quadrature connection so that the potential coil 74 is connected through potential transformer 78 to two lines of the bus 5 and the current winding 75 is connected through current transformer 41 in generator winding 2 to the remaining conductor of the three phase circuit. Similarly, relay 73 comprises a double-throw relay which has a potential coil 79, a current coil 80 and a movable contact 81 which floats between two sets of fixed contacts 82 and 82'. The potential coil 79 is connected to two lines of the bus 6 through a potential transformer 83 and the current coil 80 is connected through current transformer 42 in generator winding 3 to the remaining conductor of the three phase circuit.

In order to assure proper operation of the regulating equipment under load swings occurring during the operation of the load back-off equipment, we provide relays 84 and 85. Relay 84 is provided with normally open contacts 86 and 87 and relay 85 is provided with normally open contacts 88 and 89. The contacts of relays 84 and 85 are added so that these devices in conjunction with relays 50 and 51 actually raise as well as lower the setting of governor control pilot motor 12.

We control the field excitation control apparatus intermittently or in small increments through notching relays 90 and 91 which are controlled through the contacts of 50 and 51. Relay 90 is provided with normally closed contacts 92 and time delay closing means indicated by the dashpot 93. Relay 91 is provided with normally open contacts 94 and 95 and with time delay opening means indicated by the dashpot 96.

We also provide means to decrease the power input to the prime mover intermittently or in increments so that the load on the overloaded winding may be reduced to a predetermined value such as the previously mentioned 55 per cent value in a predetermined time. In order to provide this incremental unloading, we provide notching relays 97 and 98. Relay 97 is provided with normally closed contacts 99 and is also provided with time delay closing means indicated by the dashpot 100. Relay 98 is provided with normally closed contacts 101 and normally open contacts 102 and 103. This relay is also provided with time delay opening means indicated by the dashpot 104.

An alarm device 105, which is indicated as an electric bell, is arranged to be energized from the control bus 15 through the normally open contacts 54 of relay 50 or the normally open contacts 57 of relay 51. A control switch 106 having normally open contacts in circuit with the raise and lower circuits of governor control motor 12 is provided for effecting manual control.

The operation of the apparatus as illustrated in the drawing is substantially as follows: It will be assumed that the various relays and control devices are in the illustrated positions and the various control relays, except as otherwise noted, are in the deenergized position. From the foregoing description, it is not believed necessary to give any further description with respect to the operation of the system under normal load conditions. If the current in either generator winding 2 or 3 exceeds the predetermined value of current, for example, 55 per cent of the generator rating, the relay 43 or 47 is energized and a circuit from bus 15 is closed through contacts 46 for the operating coil of relay 50 or through contacts 49 for the operating coil of relay 51. When either relay 50 or 51 picks up, or if both pick up, the circuit of alarm device 105 is completed either through the contacts 54 of relay 50 or contacts 57 of relay 51, giving an indication to the operator of the overload condition of the machine windings. If both windings of the generator simultaneously exceed the predetermined value of 55 per cent of current, no action will be taken by the load back-off equipment which is initiated by relays 60 and 63 to reduce the generator load and the field excitation. It is assumed that such condition is a result of an operator's action and occurs under his supervision in a temporary emergency and no automatic corrective action is taken. However, if either one of the relays 43 or 47 (but not both) is energized, relay 60 is energized. Assume relay 43 has picked up. Then, as previously explained, relay 50 will pick up and will close its normally open contact 54. A circuit is then completed from the positive side of bus 15, through contact 54, contact 56 of relay 51, the operating coil of relay 60, back to the negative side of bus 15. If relay 43 drops out before the expiration of the closing time delay of relay 60, then relay 60 will be reset to its deenergized position. However, if relay 43 remains in its picked-up position until the time delay of relay 60 has expired, its contacts 61 will close and the operation of the load back-off equipment is initiated. A similar sequence of events will occur if relay 47 picks up and relay 43 is not picked up.

The closing of contacts 61 of relay 60 energizes the operating coil of hand reset relay 63 through the previously described circuit completed by the contacts of relays 50 and 51 so that normally open contacts of relay 63 are closed and the normally closed contacts are opened, whereby the control of pilot motor 19 of the motor-operated rheostat 18 is transferred from the voltage regulator 25 to reactive volt-ampere relay 72 or 73, and the high speed contacts 22 and 23 are rendered inoperative through the opening of contacts 65 of relay 63. For the more detailed consideration of the operating cycle, it will be assumed that generator winding 2 is overloaded and that relay 43 is picked up. With the closure of relay 43 and consequently relay 50, a circuit is completed for notching relays 90 and 91 which effects a step-by-step control of the motor-operated rheostat 18 under control of the reactive volt-ampere relay 72. The relays 72 and 73 are adjusted to hold approximately zero reactive power or substantially unity power factor on the generator. The notching or intermittent contact feature introduced by the notching relays 90 and 91 is to slow up the travel of the field rheostat 18 so that the generator will be able to operate at substantially unity power factor after a predetermined time, which for one situation studied has indicated that one minute would be satisfactory. The notching means may make ten to twelve impulses during the one minute period. The operating coil of relay 91 is energized from the positive side of bus 15 through the closed contacts 54 of relay 50, the closed contacts 56 of relay 51, the closed contacts 92 of relay 90 and then through the closed contacts 71' of relay 63 to the negative node of bus 15. The energization of relay 91 and closure of its contacts 94 causes the operating coil of relay 90 to be energized and this relay picks up to cause the operating coil of relay 91 to be deenergized. The time delay dropout of relay 91, through its time delay dropout means 96, is relatively short with respect to that of relay 90 through its time delay dropout means 93. No definite time delay relations can be specified for all installations but a given study has indicated that for one particular installation the time delay dropout of relay 90 may be of the order of five seconds and that of relay 91 may be of the order of one-half second or longer if desired.

During the period when relay 91 is picked up a circuit is closed from the positive side of bus 15 through contacts 95, through the closed contacts 55 of relay 50, through the contacts 77 of reactive volt-ampere relay 72, the contacts 70 of relay 63, to energize the field winding 21 of motor-operated rheostat 18 to lower the excitation of the generator, or a circuit is completed through contacts 77' of relay 72, the contacts 69 of relay 63 to field winding 20 of motor-operated rheostat 18 to raise the field excitation of the generator. Briefly stated, the operation of notching relays 90 and 91 through the contacts of the current responsive relay 50 or 51 and the reactive volt-ampere relay 72 or 73 effects control of the motor-operated rheostat to hold substantially unity power factor on the overloaded winding 2 of the generator 1.

Simultaneously with the operation just described, the current limiting relay 43 and its auxiliary relay 50, or current limiting relay 41 and its auxiliary relay 51, depending upon which winding of the generator is overloaded, will cause a lowering circuit to be made to the governor control motor 12 to effect a decrease in power input to the prime mover and thereby reduce the load on the prime mover and the current of the generator. A notching feature has been provided for this control through the notching relays 97 and 98. In studies we have made on one particular installation, we have found that it would be satisfactory to reduce the load on the overload generator winding in about two minutes time and provide notching means with some fifteen to twenty steps. The operation of relays 97 and 98 is similar to that of notching relays 90 and 91. With relay 50 picked up and relay 51 dropped out, as previously assumed, a circuit is completed from the positive side of bus 15, through contacts 53' of relay 50, through the normally closed contacts 99 of relay 97, through the operating coil of relay 98, through the contacts 71 of relay 63 (which is latched in) to the negative side of the bus 15. Relay 98 is then picked up and closes its contacts 102 to energize the operating coil of relay 97. Relay 97 picks up and deenergizes the operating coil of relay 98, but since relay 98 has a time delay opening mechanism it maintains its normally open contacts closed for its time delay period. During the time that relay 98 is picked up, its contacts 103 are closed so that a circuit is completed for the field winding 13 of governor motor 12 from the positive side of bus 15, through contacts 103 through contacts 53 of relay 50 to reduce the power input to the prime mover and thereby reduce the current of the overloaded generator winding in increments due to the notching action of relays 97 and 98.

As previously explained, the relays 84 and 85 are provided to obviate difficulties which might be occasioned by load swings. These relays are auxiliary to the control effected by the auxiliary overcurrent relays 50 and 51 in connection with the control of the governor control motor 12.

With the apparatus described exclusive of the relays 84 and 85, the regulating relays 43 and 47 only cause the motor 12 to lower. Under this condition, if load swings occur during this disturbance there would be a tendency for the relays 43 and 47 to lower motor 12 at the peak of each load swing and, therefore, may cause the turbine and generator to be unloaded below the desired load point. By the addition of relays 84 and 85 in the raising circuit of motor 12, raising impulses are given to the motor 12 at the low point of each swing cycle. Eventually, of course, the load swings will cease and when steady state conditions are restored, it will be seen that the motor 12 should come to a position corresponding to the desired loading value on the more highly loaded winding of the machine. Under the assumed conditions with relays 84 and 85 functioning, overcurrent relay 43 is picked up and relay 84 is, therefore, in the dropout position with its contacts open. Relay 85, however, would be picked up since relay 47 is deenergized. Upon the occasion of load swings causing relays 84 and 85 to be picked up simultaneously, a circuit is completed through the series related contacts 86 of relay 84 and contacts 88 of relay 85 to provide a control circuit to operate notching relays 97 and 98 in addition to the control of these relays effected through either relay 50 or relay 51. During the time relay 98 is picked up and relays 84 and 85 are simultaneously closed, a circuit is completed to energize the field winding 14 of governor pilot motor 12 and increase the power input to the prime mover. Thus, the relays 84 and 85 cause raising of the setting of the governor control mechanism 11. Thus, with the operation of relays 84 and 85 in cooperation with the operation of relays 50 and 51 the governor setting is both raised and lowered.

When the current in the overloaded generator winding has been reduced to or below the predetermined value, the load and field control is immediately stopped and the generator continues to operate at the final fixed field and governor setting until the equipment is reset by the operator. The operator resets the equipment by unlatching the mechanism 64 so that relay 63 returns to its deenergized position. This again transfers the control of the generator field excitation to the voltage regulator 25 and transfers the control of the governor control motor 12 to the manually operated control switch 106.

From the foregoing description of the operation when generator winding 2 is overloaded, it is believed that those skilled in the art will readily understand the operating cycle when generator winding 3 is overloaded and no further description is believed to be necessary.

While we have shown and described a particular embodiment of our invention, it will be obvious to those skilled in the art that changes and modifications may be made without departing from our invention and we, therefore, aim in the appended claims to cover all such changes and modifications as fall within the true spirit and scope of our invention.

What we claim as new and desire to secure by Letters Patent of the United States is:

1. In combination, an alternating current dynamo-electric machine, an excitation circuit for said machine regulating means for varying the energization of said excitation circuit, means responsive to the voltage of said machine for controlling said regulating means, means responsive to the power factor of said machine for controlling said regulating means, and means responsive to an electrical condition of said machine for selectively placing said regulating means under the control of said voltage responsive means or said power factor responsive means.

2. In combination, an alternating current dynamo-electric machine, means for regulating the excitation of said machine, a voltage responsive means for controlling said excitation regulating means, power factor responsive means for controlling said excitation regulating means, means responsive to the current of said machine for selectively placing said regulating means under the control of said voltage regulator responsive means or said power factor responsive means, and means for effecting intermittent control of said excitation controlling means during operation under control of said power factor responsive means.

3. In combination, an alternating current dynamo-electric machine, an excitation circuit for said machine, regulating means for varying the energization of said excitation circuit, means responsive to the voltage of said machine for controlling said regulating means, means responsive to the reactive volt-amperes of said machine for controlling said regulating means, and means responsive to current in said machine below a predetermined value for placing said regulating means under control of said voltage responsive means and responsive to current in said machine above a predetermined value for transferring control of said regulating means from said voltage responsive means to said means responsive to reactive volt-amperes of said machine.

4. In combination, an alternating current dynamo-electric machine, an excitation circuit for said machine, regulating means for varying the energization of said excitation circuit, means responsive to the voltage of said machine for controlling said regulating means, means responsive to the reactive-volt amperes of said machine for controlling said regulating means, said voltage responsive means being arranged to control said regulating means for current values of said machine below a predetermined value, means responsive to the current of said machine above said predetermined value for transferring control of said regulating means to said reactive volt-ampere responsive means, and means for delaying the operation of said last mentioned means until current values above said predetermined value exist for a predetermined time.

5. In an electrical system, an alternating current generator, an excitation circuit for said generator, means responsive to the voltage of said generator for controlling the energization of said excitation circuit for generator currents below a predetermined value to maintain the voltage of said generator at a predetermined value, and means responsive to current in said generator above said predetermined value for controlling said excitation circuit to maintain the reactive current of said generator at substantially zero.

6. In an electrical system, a double-winding alternating current generator having a pair of separately insulated armature windings and being provided with a single rotor, an excitation circuit for said rotor, regulating means for controlling the energization of said excitation circuit, means responsive to the voltage of said generator for controlling said regulating means to regulate the voltage of said generator, and means responsive to the current of said windings and operative when the current in any one winding is above a predetermined value and the current of the other winding is below said predetermined value for controlling said excitation circuit to maintain the reactive current of said generator at substantially zero.

7. In an electrical system, a double-winding alternating current generator having a pair of separately insulated armature windings and being provided with a single rotor, an excitation circuit for said rotor, regulating means for controlling the energization of said excitation circuit, means responsive to the voltage of said generator for controlling said regulating means, means responsive to the power factor of each one of said armature windings, and means responsive to the current of said armature windings and operative when only one of said windings is traversed by current to transfer the control of said regulating means from said voltage responsive means to said power factor responsive means associated with the armature winding traversed by current for maintaining the power factor of said machine at substantially unity power factor.

8. In an electrical system, a double-winding alternating current generator having a pair of separately insulated armature windings and being provided with a single rotor, an excitation circuit for said rotor, regulating means for controlling the energization of said excitation circuit, current responsive means associated with each one of said armature windings and each being arranged to be operated to a control position when the current in its associated armature winding exceeds a predetermined value, means responsive to the reactive volt-amperes of said generator for controlling said regulating means, and means operative in response to the operation of only one of said current responsive means to its control position for placing said regulating means under the control of said reactive volt-ampere responsive means.

9. In an electrical system, a double-winding alternating current generator having a pair of separately insulated armature windings and being provided with a single rotor, an excitation circuit for said rotor, regulating means for controlling the energization of said excitation circuit and comprising slow and fast means for raising and lowering the excitation of said generator, means responsive to the voltage of said generator for controlling said regulating means, means responsive to the reactive volt-amperes of said generator for controlling said regulating means, means responsive to current above a predetermined value in either one of said armature windings when current in the other winding is below said predetermined value for transferring control of said regulating means from said voltage responsive means to said reactive volt-ampere responsive means, means controlled by the operation of said last mentioned means for rendering the fast means of said regulating means inoperative, and means for effecting intermittent operation of said slow regulating means during operation under control of said reactive volt-ampere responsive means.

10. In an electrical system, an alternating current generator, means for controlling the voltage of said generator, means for controlling the power factor of said generator, means responsive to a predetermined electrical condition of said generator for transferring control of said generator from said first mentioned means to said second mentioned means, and means responsive to the current of said generator and operative when said generator is under control of said second mentioned means for controlling the kilowatt output of said generator.

LEO H. PERRY.
HERMAN BANY.